United States Patent
Bucknell et al.

(10) Patent No.: US 8,953,519 B2
(45) Date of Patent: Feb. 10, 2015

(54) WIRELESS COMMUNICATION SYSTEM AND METHOD FOR DETERMINING THE SIZE ALLOCATED TO A FIELD IN THE HEADER OF A PACKET BASED ON THE LENGTH OF THE PACKET PAYLOAD

(75) Inventors: Paul Bucknell, Brighton (GB); Matthew Peter John Baker, Canterbury (GB)

(73) Assignees: Koninklijke Philips N.V., Eindhoven (NL); Sharp Corporation, Osaka (JP)

( * ) Notice: Subject to any disclaimer, the term of this patent is extended or adjusted under 35 U.S.C. 154(b) by 782 days.

(21) Appl. No.: 12/522,049

(22) PCT Filed: Jan. 7, 2008

(86) PCT No.: PCT/IB2008/050028
§ 371 (c)(1),
(2), (4) Date: Jul. 2, 2009

(87) PCT Pub. No.: WO2008/084426
PCT Pub. Date: Jul. 17, 2008

(65) Prior Publication Data
US 2009/0310537 A1    Dec. 17, 2009

(30) Foreign Application Priority Data
Jan. 9, 2007    (EP) .................................... 07300711

(51) Int. Cl.
*H04W 4/00*    (2009.01)
*H04W 28/06*    (2009.01)
(Continued)

(52) U.S. Cl.
CPC ............. *H04W 28/065* (2013.01); *H04L 47/34* (2013.01); *H04L 69/22* (2013.01); *H04L 69/324* (2013.01); *H04L 47/14* (2013.01)

USPC ......................................................... 370/328

(58) Field of Classification Search
USPC ......................................................... 370/328
See application file for complete search history.

(56) References Cited

U.S. PATENT DOCUMENTS 5,627,829 A    5/1997    Gleeson et al.
6,317,430 B1    11/2001    Knisely et al.
(Continued)

FOREIGN PATENT DOCUMENTS

EP    1562334 A2    8/2005
JP    2000032088 A    1/2000

OTHER PUBLICATIONS

"Universal Mobile Telecommunications System (UMTS)"; Medium Access Control (MAC) Protocol Specification (3GPP TS 25.321 V7.3.0 Release 7); ETSI TS 125 321 ETSI Standards, LIS, vol. 3-R2, No. V7.3.0, Dec. 1, 2006, 118 Page Document.

*Primary Examiner* — Derrick Ferris
*Assistant Examiner* — Faisal Choudhury

(57) ABSTRACT

A method of transmitting a data signal in a wireless communication system from a primary station to a secondary station, where the data signal includes a medium access control header (MAC-hs header) and a protocol data unit associated with the medium access control header. The medium access control header includes a set of fields (TSN, SEG, LI, LCid). The method includes determining a size allocated to at least one field of the set based at least in part on a length of the protocol data unit. For example, the size allocated to a segmentation indication field (SEG) determined for a first length of the protocol data unit is lower than the one determined for a second length of the protocol data unit, where the second length being higher than said first length, where the segmentation indication indicates in how many segments the protocol data unit is subdivided.

11 Claims, 6 Drawing Sheets

(51) Int. Cl.
*H04L 12/801* (2013.01)
*H04L 29/06* (2006.01)
*H04L 29/08* (2006.01)

(56) References Cited

U.S. PATENT DOCUMENTS

| | | | | |
|---|---|---|---|---|
| 6,772,215 | B1* | 8/2004 | Rathonyi et al. | 709/230 |
| 7,535,886 | B2* | 5/2009 | Lee et al. | 370/348 |
| 7,675,941 | B2* | 3/2010 | Kim et al. | 370/473 |
| 8,085,753 | B2* | 12/2011 | Wu | 370/349 |
| 2005/0174985 | A1* | 8/2005 | Lee et al. | 370/349 |
| 2006/0034175 | A1* | 2/2006 | Herrmann | 370/236 |
| 2006/0067364 | A1* | 3/2006 | Jung et al. | 370/469 |
| 2006/0146761 | A1* | 7/2006 | Kim et al. | 370/335 |
| 2007/0058656 | A1* | 3/2007 | Breslow et al. | 370/437 |
| 2007/0060139 | A1* | 3/2007 | Kim et al. | 455/445 |
| 2007/0091810 | A1* | 4/2007 | Kim et al. | 370/236 |
| 2007/0211758 | A1* | 9/2007 | Aarnio | 370/469 |
| 2007/0253447 | A1* | 11/2007 | Jiang | 370/474 |
| 2008/0002567 | A1* | 1/2008 | Bourlas et al. | 370/208 |
| 2008/0089285 | A1* | 4/2008 | Pirskanen et al. | 370/329 |
| 2009/0022134 | A1* | 1/2009 | Chun et al. | 370/342 |
| 2009/0036061 | A1* | 2/2009 | Chun et al. | 455/68 |
| 2009/0221242 | A1* | 9/2009 | Bergstrom et al. | 455/73 |
| 2010/0074276 | A1* | 3/2010 | Bergstrom et al. | 370/471 |
| 2011/0158141 | A1* | 6/2011 | Lee et al. | 370/310 |
| 2012/0281660 | A1* | 11/2012 | Pinheiro et al. | 370/329 |

* cited by examiner

WIRELESS COMMUNICATION SYSTEM AND METHOD FOR DETERMINING THE SIZE ALLOCATED TO A FIELD IN THE HEADER OF A PACKET BASED ON THE LENGTH OF THE PACKET PAYLOAD

FIELD OF THE INVENTION

The invention relates generally to a method of method of transmitting a data signal in a wireless communication system from a primary station to a secondary station.

The invention also relates to a primary station for transmitting a data signal to a secondary station, said primary and secondary station being part of such a wireless communication system.

The invention finds application, for example, in the field of mobile communication and more especially Universal Mobile Telecommunications System (UMTS) mobile communication.

BACKGROUND OF THE INVENTION

FIG. 1 shows a diagram of the protocol stack for UMTS. The radio interface is layered into three protocol layers:
- the physical layer (L1);
- the data link layer (L2);
- network layer (L3).

A more detailed description is outlined in the 3GPP specification document TS 25.301.

Layer 2 is split into following sub layers: Medium Access Control (MAC), Radio Link Control (RLC), Packet Data Convergence Protocol (PDCP) and Broadcast/Multicast Control (BMC). Layer 3 and RLC are divided into Control (C-) and User (U-) planes. PDCP and BMC exist in the U-plane only. In the C-plane, Layer 3 is partitioned into sub layers where the lowest sub layer, denoted as Radio Resource Control (RRC), interfaces with layer 2 and terminates in the UTRAN. Service Access Points (SAP) for peer-to-peer communication are marked with circles at the interface between sub layers. The SAP between MAC and the physical layer provides the transport channels. The SAPs between RLC and the MAC sub layer provide the logical channels.

Also shown are connections between RRC and MAC as well as RRC and L1 providing local inter-layer control services. These interfaces allow the RRC to control the configuration of the lower layers. For this purpose separate Control SAPs are defined between RRC and each lower layer (PDCP, RLC, MAC, and L1). The RLC sub layer can provide retransmission functionality as well as segmentation/reassembly functionality. The MAC sub layer provides mapping of the logical channel(s) onto the appropriate transport channel(s), the selection of appropriate Transport Format Combinations and the multiplexing/demultiplexing of higher layer Protocol Data Units (PDU) into/from transport channel PDUs (called Transport Block). That means a MAC PDU is defined as a RLC PDU plus a MAC header.

The RLC provides three main delivery services to higher layers:
- TM (Transparent Mode): does not add header information to higher layer PDUs; however, it may segment the information if required, with the size of the segments being determined from the transport formats.
- UM (Unacknowledged Mode): as TM above, but also allows for concatenation of higher-layer PDUs; thus a header is required.
- AM (Acknowledged Mode): provides segmentation and reassembly, concatenation, error correction, in-sequence delivery of higher-layer PDUs, duplicate detection, flow control, and ciphering.

FIG. 2 shows the MAC header and data payload as currently defined for release 6 of UMTS in the Downlink (for High Speed Downlink Packet Access HSDPA). Said MAC header comprises:
- VF (Version Flag) for extension capabilities;
- Queue ID for identification of the reordering queue on the UE (User Equipment) side;
- TSN (Transmission Sequence Number) used for reordering purposes (i.e. the received MAC PDUs are reordered according to their associated TSN);
- $SID_k$ (Size Index IDentifier), which indicates the size of a set of consecutive PDUs of the same length;
- $N_k$, which represents the number of consecutive PDUs;
- $F_k$, which is a flag indicating if $SID_k$ or a PDU is following (0=SID follows, 1=PDU follows).

Proposals have been made to design the MAC and RLC in release 7 of UMTS as follows. The RLC-AM (Radio Link Control Acknowledged mode) will be enhanced to support flexible PDU sizes (a PDU comprises data and control information which is passed between layers in a protocol stack). The MAC-hs (i.e. the MAC entity in the base station controlling the High Speed Downlink Shared CHannel HS-DSCH) will be enhanced to support RLC PDU segmentation. The SID and N fields (SID identifies logical channel and the size of N consecutive RLC PDUs and N the number of consecutive RLC PDUs) need to be updated in order to be able to indicate the size of the RLC PDU. It seems highly likely that backwards compatibility will be maintained by using the VF flag in the MAC-hs header.

The design of the RLC should take into account the available memory in a given implementation for the processing of layer 2 data, the maximum RLC window size (namely the currently acceptable range of sequence numbers to the receiver) supported and the RLC round-trip-time. If the number of RLC PDUs is increased for a given amount of data then the RLC transmission window will advance faster and the receiver generate more ACK/NACKs (ACKnowledgement/Negative ACKnowledgement) in the status reports. There has been a drive to reduce L2 RLC RTT to avoid RLC window stalling. RLC window stalling is when the RLC entity has to wait (i.e. window cannot advance) for a re-transmission and positive acknowledgment of a PDU. The maximum sustainable rate can be estimated by:

Rate=window size*PDU Size/RTT (assuming zero RLC-level retransmissions).

With typical assumptions of a 2047 RLC window size (4095 is the maximum), a 100 ms round trip delay between RLC and UE and a 320 bit RLC PDU size, an error less flow would sustain a maximum data rate of 2047*320/0.1=6.55 Mbps (13.1 Mbps with 640 bit PDUs).

As seen above, the maximum sustainable data rate of RLC would not be high enough to support the expected data rates (greater than 14 Mbps) when MIMO or higher-order modulation (64 QAM) is used in Release-7 UMTS. Therefore, some improvements to layer 2 have to be made.

SUMMARY OF THE INVENTION

It is an object of the present invention to provide an improved method of transmitting a data signal in a wireless communication system from a primary station to a secondary station.

In accordance with a first aspect of the invention, there is provided a method of transmitting a data signal in a wireless communication system from a primary station to a secondary station, said data signal comprising a header and a protocol data unit associated with said header, said header comprising a set of fields, wherein said method comprises determining a size allocated to at least one field of the set on the basis of a length of the protocol data unit.

Such a method reduces the amount of overhead in the header by optimising the fields comprised in said header as a function of the length of the protocol data unit.

More specifically, this method proposes a flexible MAC header format, which allows optimisation for a range of possible RLC PDU sizes, multiplexing and segmentation. The invention allows the MAC header size to be reduced, based on the recognition that not all combinations of field-contents that may be signalled in the MAC header are useful in all scenarios, and the MAC header size may therefore be reduced by reducing the size of at least one of the fields. In some cases, this reduction arises from the recognition of dependencies between different fields of the header: for example, it may be identified that in certain scenarios which require a first field to be able to signal a large range of values (requiring a large field size), the range of values required in a second field may be reduced, and therefore the size of the second field may be reduced.

According to an embodiment of the invention, the size allocated to a segmentation indication field determined for a first length of the protocol data unit is lower than the one determined for a second length of the protocol data unit, said second length being higher than said first length, said segmentation indication indicating in how many segments the protocol data unit is subdivided.

According to another embodiment of the invention, the size allocated to a transmission sequence number field determined for a first length of the protocol data unit is higher than the one determined for a second length of the protocol data unit, said second length being higher than said first length, said transmission sequence number being used for reordering the protocol data unit.

The invention is based on the recognition that when protocol data units are large then typically a smaller range of transmission sequence numbers is required, with more segmentation, as opposed to small protocol data units with a larger range of transmission sequence number and little or no segmentation.

According to another embodiment of the invention, a value of a format field is determined on the basis of the length of the protocol data unit, said format value indicating the size allocated to the at least one field of the set.

Beneficially, the wireless communication system is the Universal Mobile Telecommunications System.

In accordance with a second aspect of the invention, there is provided a primary station for transmitting a data signal to a secondary station, said primary and secondary station being part of a wireless communication system, said data signal comprising a header and a protocol data unit associated with said header, said header comprising a set of fields, wherein said primary station comprises means for determining a size allocated to at least one field of the set on the basis of a length of the protocol data unit.

Said primary station may be a mobile phone or a base station. Said means for determining are for example a controller or a processor.

In accordance with a third aspect of the invention, there is provided a data signal for use in a wireless communication system, said data signal comprising a header and a protocol data unit associated with said header, wherein the header comprises:

a length indication indicating the length of the protocol data unit, a transmission sequence number used for reordering the protocol data unit and/or a segmentation indication indicating in how many segments the protocol data unit is subdivided, wherein the size allocated to one of the length indication, transmission sequence number and segmentation indication is determined on the basis of the length indication.

The invention finally relates to a computer program product directly loadable into an internal memory of a primary station, comprising software code portions for performing all the steps of the method when said product is run on said primary station.

These and other aspects of the present invention will be apparent from, and elucidated with reference to, the embodiment described herein.

BRIEF DESCRIPTION OF THE DRAWINGS

An embodiment of the present invention will now be described by way of example only and with reference to the accompanying drawings, in which.

DETAILED DESCRIPTION OF THE INVENTION

In Release-7 UMTS, in order to support higher data rates, the RLC-AM is being redesigned to be able to use flexible RLC PDU sizes. This will require a new MAC header to support the transmission of the RLC PDUs over HARQ (Hybrid Automatic Repeat Request) processes.

This invention proposes a flexible MAC header format, which allows optimisation for a range of possible RLC PDU sizes dependent on the class of data and/or the data packet size to be transported. This includes for example the RLC PDU size, and/or the available transport block sizes, and/or the logical channel to be transported.

The invention takes the following aspect into consideration. If the range of Transmission Sequence Numbers TSNs that can be signalled is too small (i.e. too short a Sequence Number field in the MAC header) then it may be possible that when many RLC PDUs are transmitted the TSN wraps around and therefore the receiving MAC entity cannot reconstruct the correct order for the RLC PDUs. On the other hand, if the range of TSNs that can be signalled is too large then more bits are being used than are required and this increases the amount of signalling overhead, and thus reduces the efficiency of the overall data transmission. Similarly, if the number of segmentation bits is too small, the number of segments into which an RLC PDU may be divided may be too limited for large packets, while if the number of segmentation bits is large the overhead of the MAC header may be unnecessarily increased for small RLC PDUs which are not segmented. Therefore an object of the invention is to reduce the MAC header overhead while still providing flexible segmentation and sequence numbering.

The invention is based on the fact that, when RLC PDUs are large then typically a smaller TSN range is required, with more segmentation, whereas small RLC PDUs typically require a larger TSN range and little or no segmentation.

Figure 1:
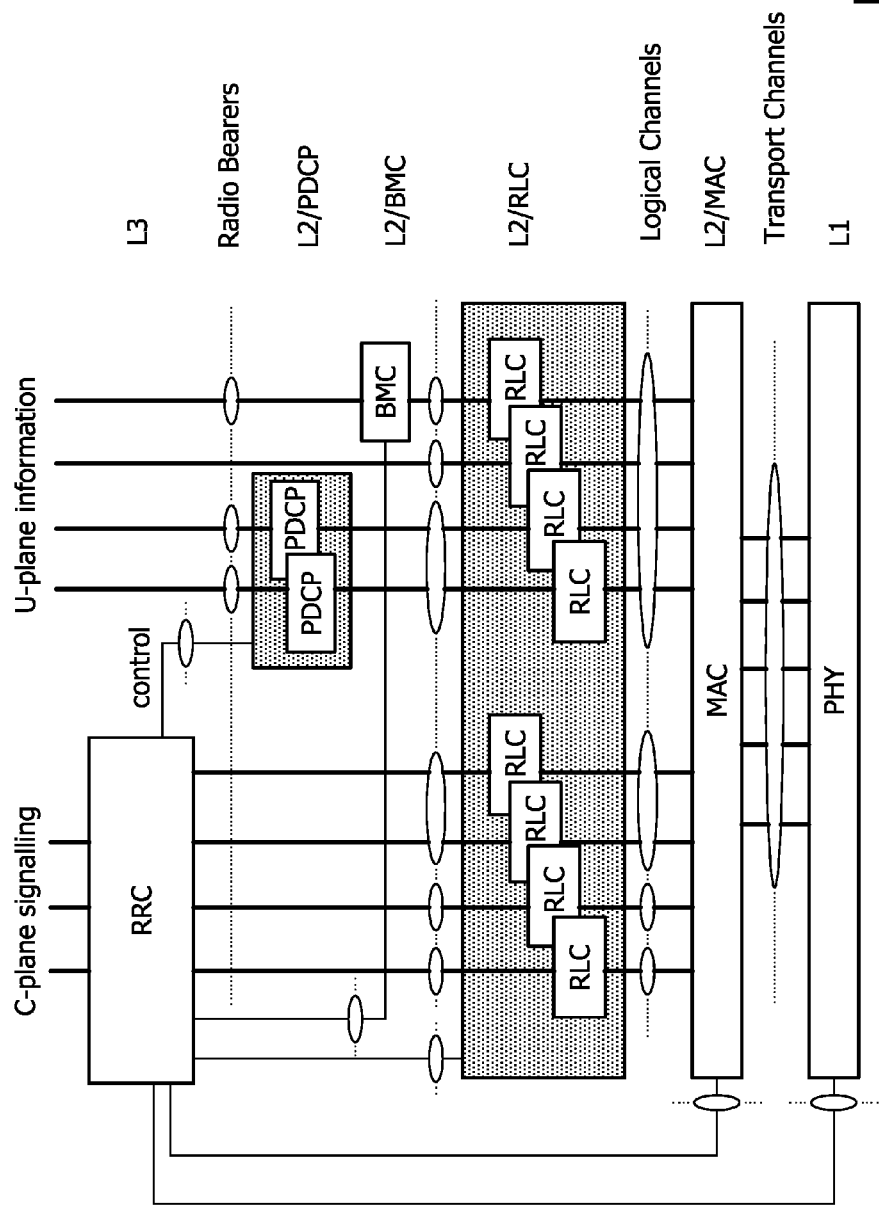
FIG. 1 is a block a diagram of the protocol stack for UMTS.
Figure 2:
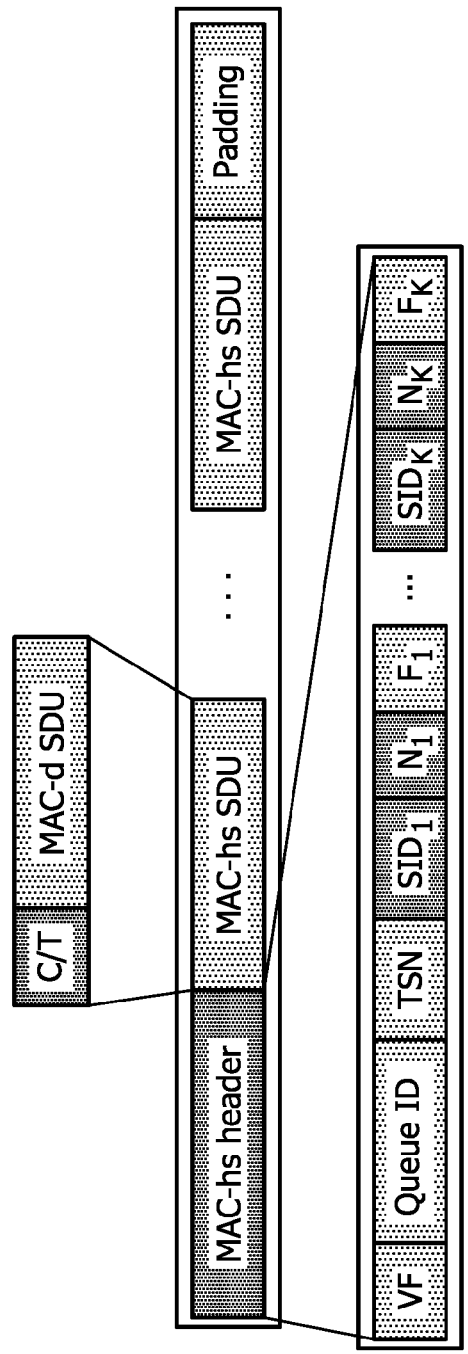
FIG. 2 shows the structure of a MAC header in accordance with release 6 of UMTS.
Figure 3:
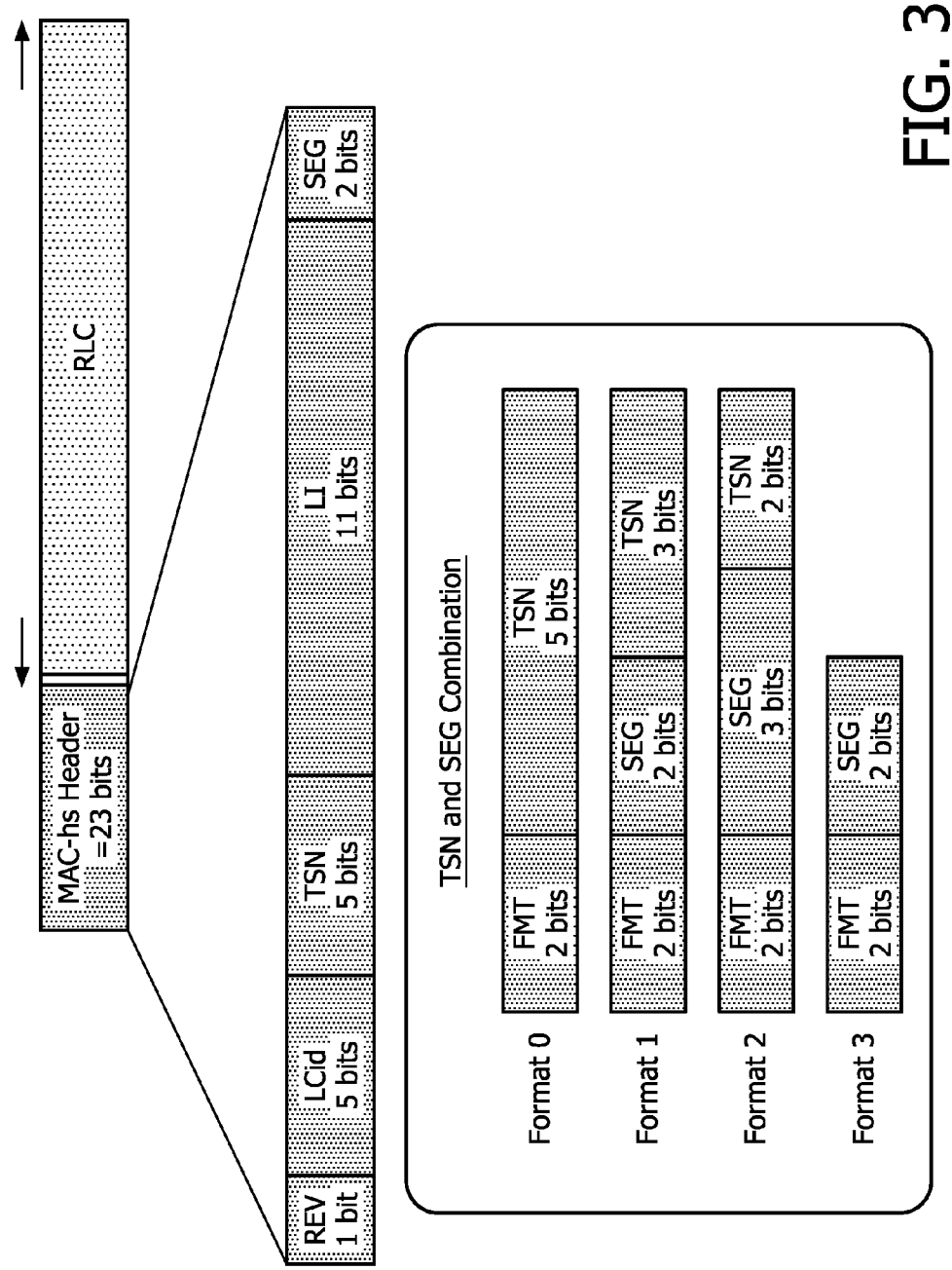
FIGS. 3 to 6 show the structure of a MAC header in accordance with different embodiments of the invention.

FIG. 3 shows the MAC header structure in accordance with the invention.

The Release-6 field N (representing the number of consecutive MAC-d PDUs) is replaced by a Length Indicator LI, which works for example on byte aligned basis allowing byte accuracy in MAC-hs segmentation. The length indicator may indicate the length of the whole RLC PDU (if segmentation is predetermined to take place into equally-sized segments) or the length of the segment of the RLC PDU contained within the current MAC PDU. Additionally a segmentation field is shown, comprised of for example 2 bits, which could indicate up to 4 segments—the "first segment", "first middle segment", "second middle segment" and "last segment" of the MAC-hs SDU in similar manner as in RLC from Release-6. Alternatively, only three of the available four values can be used if the segmentation is predetermined to subdivide the RLC PDU into only three segments.

In the lower half of FIG. 3 then shows an additional 2-bit format (FMT) field into the MAC header. This format is used to indicate 4 possible combinations of TSN and segmentation indication. In the above example the following 4 cases are shown:

Format 0 (e.g. 00) corresponds to a 5-bits TSN for the case where no segmentation is performed and therefore small RLC PDUs are assumed, and the maximum number of bits is therefore required to signal the TSN to avoid window wrap-around.

Format 1 (e.g. 01) is where 2 bits are allocated to signalling the segmentation of the RLC PDUs. In this case a smaller amount of signalling is required for the TSN, as the RLC PDUs are assumed to be larger.

Format 2 (e.g. 10) shows more segmentation being signalled and thus the range of RLC PDUS transmission sequence numbers will be even smaller than in Format 1.

Format 3 (e.g. 11) shows the extreme case where no sequence number is defined and all the remaining bits are used for Segmentation indication. Typically though it could be more efficient in this case to also shorten the MAC header to reduce the overall signalling load. This format may be appropriate for certain data flows that do not require re-ordering, for example highly delay sensitive traffic.

Alternatively and advantageously, rather than using a FMT field, the format of the MAC header can be configured by RRC signalling. This would avoid increasing the MAC header overhead by adding the FMT field. More specifically, the RRC signalling alternative consists in pre-defining the format in a semi-static way. For example when a initial connection between a UE and a network is established, a procedure entails the setting up of a radio bearer for the transmission of data in the user or control planes. When this radio bearer is set up then the format of the MAC header is also set up at the same time for the data carried in that radio bearer. This header format is then used for the duration of the life of that radio bearer, typically as long as the radio bearer is in use.

It may be also possible to have some combination of the use of the FMT field and RRC signalling where RRC signalling indicates a range of formats and then a format indicator indicates a sub range of the identified range.

According to an embodiment of the invention, a dependency is exploited between the size of the RLC PDUs and the amount of segmentation SEG required. When the RLC PDU is segmented into many portions, then typically larger RLC PDUs are being used, which require more bits to signal the range of possible lengths, and when less segmentation is performed is the RLC PDUs will typically be smaller requiring a smaller range of lengths to be signalled. In summary:

Large RLC PDUs→large LI, large SEG
Small RLC PDUs→small LI, small SEG

Thus it may not be necessary to configure the length of the SEG field independently from the length of the LI field, but the length of one may be inferred from the length of the other.

Figure 4:
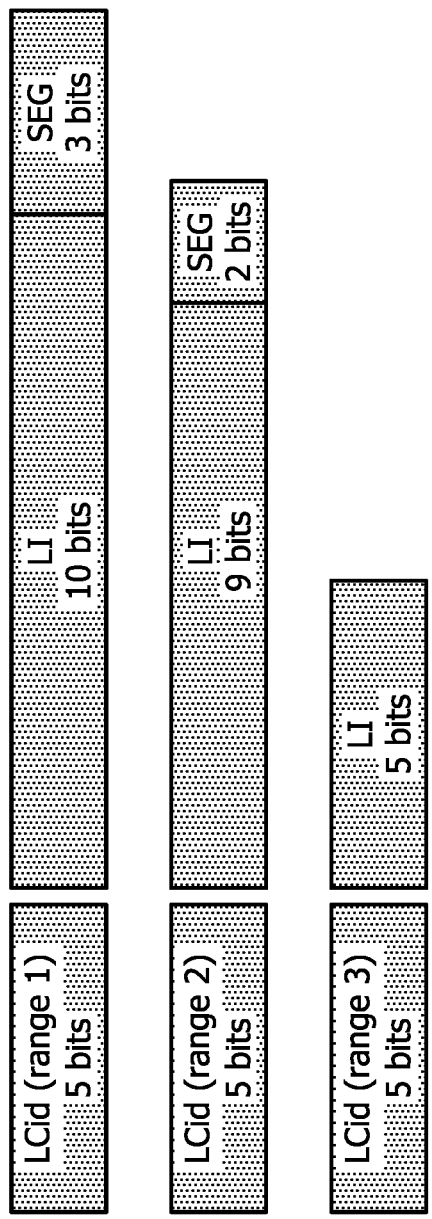

In an extension of this embodiment, the Logical Channel ID (LCid) is used to indicate the size of the LI, as shown by the example in FIG. 4. For example, a range of LCids is defined where part of that range can indicate that a smaller size of LI is used, a smaller size of LI being used typically when smaller PDUs are transmitted. In summary:

Large RLC PDUs→use first set of LCids→large LI, large SEG
Small RLC PDUs→use second set of LCids→small LI, small SEG In the example shown in FIG. 4, 5 bits are used for the logical channel ID such that a range of 32 logical channels can be signalled. If for example some of those 32 logical channels are typically only carrying smaller PDUs, then the amount of signalling required for the length of that PDU is typically much smaller, thus the size of the field used to indicate length (the LI field) can be equally much smaller. In the example shown, when another range 3 of LCids are used then the length indicator can be sent alone without a segmentation indication.

Figure 5:
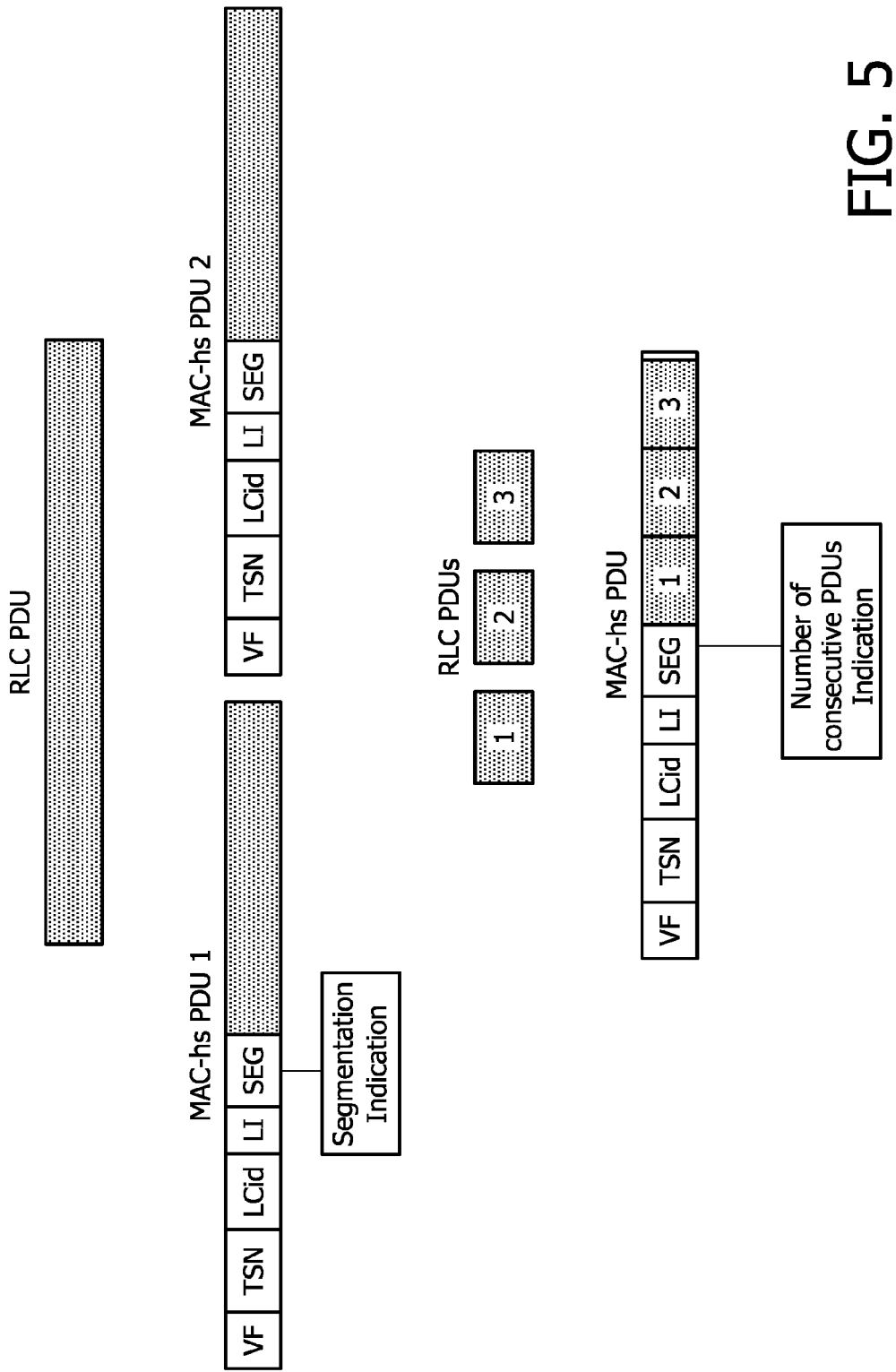

In a further embodiment the length of the LI field can determine the interpretation of the SEG field. For example for large PDUs that may not fit into a MAC-hs PDU then segmentation is more likely to be required. For smaller RLC PDUs segmentation is generally less likely to be required. However when small RLCs are being assembled into a MAC-hs PDU, there may be space available for more than one of these RLC PDUs to be transmitted in the same MAC-hs PDU. Then the SEG field could be re-used as an indication of the number of consecutive RLC PDUs of the same LCid that are concatenated into the MAC-hs PDU. As an example of this case, FIG. 5 indicates the two possible cases for the use of the segmentation field. In the first example the RLC PDU is segmented into MAC-hs PDU 1 and MAC-hs PDU2 and the SEG field acts as a segment identifier, while in the second example three smaller RLC PDUs (numbered 1,2,3) are concatenated into a MAC-hs PDU. In the second case the SEG field is no longer an indication of segmentation but becomes used to indicate the exact number of RLC PDUs contained in the MAC-hs PDU (more like a multiplexing identifier). This can be summarised as:

If LI length (or a LCid indicating a given LI length)>threshold then SEG=indication of segmentation,
If LI length (or a LCid indicating a given LI length) <threshold then SEG=indication of number of consecutively concatenated RLC PDUs, where threshold is a pre-defined measure of LI, where above it, the size of RLC PDUs is generally large enough so that segmentation rather than concatenation is required.

Figure 6:
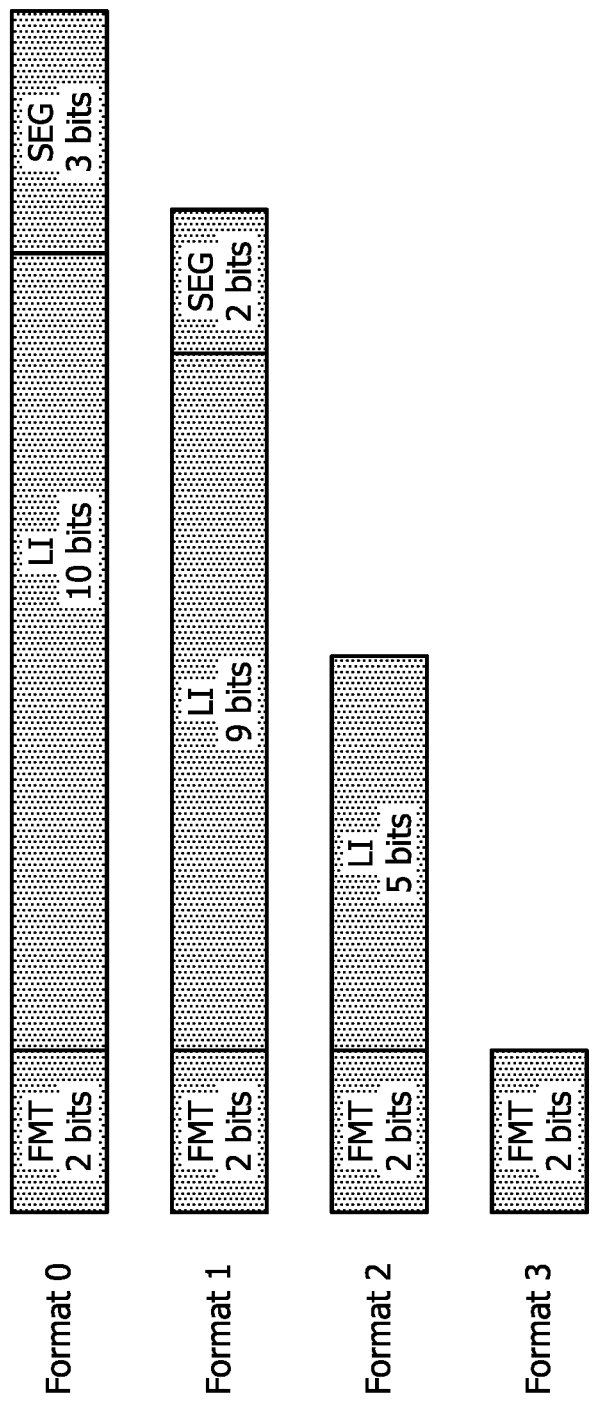

FIG. 6 shows another aspect of the embodiments of the invention, whereby an additional 2 bit format (FMT) field is introduced into the MAC header to indicate 4 possible combinations of length and segmentation indication. In the above example the following 4 cases are defined:

Format 0: 10 bits LI for the case where up to 3 bits of segmentation is performed and therefore there is a large range of possible RLC PDU sizes possible, and the maximum number of bits is required to signal the Length indication and possible MAC segmentation.

Format 1 is where 2 bits are allocated to signalling the MAC level segmentation. In this case a smaller amount of signalling is required for the Length Indication (9 bits).

Format 2 shows no segmentation being signalled and thus the range of lengths of RLC PDU sizes that are required to be signalled will be even smaller (5 bits).

Format 3 shows the extreme case where only one length of RLC PDU is defined all the no bits are used for length or segmentation indication. This reduces the size of the MAC header and thus the overall signalling load. This format may be appropriate for certain data flows that always have a fixed length transmission packet size, where segmentation is not required.

Alternatively and as described hereinbefore, rather than using a FMT field, the format of the MAC header could be configured by RRC signalling.

It should be noted that an alternative implementation to the embodiments already described is the case where no segmentation field is defined in the MAC header and only the size of the LI field varies.

One or more of the following factors may determine the choice of format for the new optimised MAC header:
the size of the maximum RLC PDU to be transmitted;
the logical channel to be transmitted, which could be configured by RRC at when the logical channel is defined at radio bearer setup;
the available transport block size, which, if small may require that more segmentation takes place to allow RLC PDUs to be efficiently transmitted Note that while the above description is in terms of "downlink" (i.e. a transmission from a base station to a mobile station), the invention is equally applicable to the uplink (i.e. a transmission from a mobile station to a base station).

It should be noted that the above-mentioned embodiments illustrate rather than limit the invention, and that those skilled in the art will be capable of designing many alternative embodiments without departing from the scope of the invention as defined by the appended claims. For example, an embodiment of the invention relates to a method of transmitting a data signal in a wireless communication system from a primary station to a secondary station, said data signal comprising a data packet comprising a header and at least one protocol data unit and/or at least one part of a protocol data unit, said header comprising a set of parameters wherein said method comprises determining a size allocated to a field for transmitting at least one parameter of the set on the basis of the size of at least one other field and/or the value of at least one of the parameters. The set of parameters comprise one or more of a transmission sequence number field, a segmentation indication field, a length indication field and a Logical Channel ID field.

In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa.

The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of transmitting a data signal in a wireless communication system from a primary station to a secondary station, said data signal comprising a header and a protocol data unit associated with said header, said header comprising a set of fields including a transmission sequence number field used for reordering the protocol data unit, wherein said method comprises:
determining by a processor, a size allocated to the transmission sequence number field based on a length of the protocol data unit; and
allocating the determined size to the transmission sequence number field of the header,
wherein the set of fields further includes a format field, and wherein a format value of the format field is determined based at least in part on the length of the protocol data unit, said format value indicating a size allocated to at least one field of the set of fields.

2. The method as claimed in claim 1, wherein the set of fields further includes a segmentation indication field, and wherein a size allocated to the segmentation indication field determined for a first length of the protocol data unit is lower than the one determined for a second length of the protocol data unit, said second length being higher than said first length, the size of said segmentation indication field indicating in how many segments the protocol data unit is subdivided.

3. The method as claimed in claim 1, wherein a size allocated to the transmission sequence number field determined for a first length of the protocol data unit is higher than the one determined for a second length of the protocol data unit, said second length being higher than said first length.

4. The method as claimed in claim 1, wherein the set of fields further includes a length indication field, and wherein a size allocated to the length indication field determined for a first length of the protocol data unit is lower than the one determined for a second length of the protocol data unit, said second length being higher than said first length, said length indication indicating the length of the protocol data unit.

5. The method as claimed in claim 4, wherein the set of fields further includes a logical channel identifier field to indicate the size allocated to the length indication field.

6. The method as claimed in claim 1, wherein the wireless communication system is the Universal Mobile Telecommunications System.

7. The primary station as claimed in claim 1, wherein said primary station is a mobile phone.

8. A primary station for transmitting a data signal to a secondary station, said primary station and said secondary station being part of a wireless communication system, the primary station comprising:
a transmitter configured to transmit the data signal to the secondary station, said data signal comprising a header and a protocol data unit associated with said header, said header comprising a set of fields including a transmission sequence number field used for reordering the protocol data unit; and
a processor configured to determine a size allocated to the transmission sequence number field based on a length of the protocol data unit, and allocate the determined size to the transmission sequence number field of the header, wherein the set of fields further includes a format field, and wherein a format value of the format field is determined based at least in part on the length of the protocol data unit, said format value indicating a size allocated to at least one field of the set of fields.

9. A wireless communication system, comprising:
a primary station configured to transmit a data signal; and
a secondary station configured to receive the data signal, said data signal comprising a header and a protocol data unit, wherein the header includes a set of fields comprises:
a length indication indicating a length of the protocol data unit associated with said header;
a transmission sequence number having a value is used for reordering the protocol data unit; and
a segmentation indication having a value is indicating in how many segments the protocol data unit is subdivided, wherein a size allocated to the transmission sequence number is determined based on the length indication, and
wherein the set of fields further includes a format field, and wherein a format value of the format field is determined based at least in part on the length of the protocol data unit, said format value indicating a size allocated to at least one field of the set of fields.

10. The data signal as claimed in claim 9, wherein the header further comprises a format field having a value which is determined based at least in part on the length of the protocol data unit, said value indicating the size of the transmission sequence number and of the segmentation indication.

11. A non-transitory computer readable medium embodying a computer program product directly loadable into an internal memory of a primary station, comprising software code portions for performing method of transmitting a data signal in a wireless communication system from a primary station to a secondary station when said computer program product is run on said primary station, said data signal comprising a header and a protocol data unit associated with said header, said header comprising a set of fields including a transmission sequence number field used for reordering the protocol data unit, wherein said method comprises:
determining a size allocated to the transmission sequence number field based on a length of the protocol data unit; and
allocating the determined size to the transmission sequence number field of the header,
wherein the set of fields further includes a format field, and wherein a format value of the format field is determined based at least in part on the length of the protocol data unit, said format value indicating a size allocated to at least one field of the set of fields.

* * * * *